United States Patent
Yeh

(10) Patent No.: US 10,423,524 B2
(45) Date of Patent: Sep. 24, 2019

(54) MEMORY STORAGE DEVICE, CONTROL CIRCUIT UNIT AND METHOD INCLUDING STORING LOGICAL-TO-PHYSICAL TABLE BIT MAP INFORMATION IN A MANAGEMENT UNIT AND NOT STORING IDENTICAL DATA CONTENT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 45 days.

(21) Appl. No.: 15/706,765

(22) Filed: Sep. 18, 2017

(65) Prior Publication Data

US 2019/0034329 A1    Jan. 31, 2019

(30) Foreign Application Priority Data

Jul. 27, 2017    (TW) .............................. 106125239 A

(51) Int. Cl.
*G06F 12/02* (2006.01)
*G06F 3/06* (2006.01)

(52) U.S. Cl.
CPC ........ *G06F 12/0246* (2013.01); *G06F 3/0619* (2013.01); *G06F 3/0631* (2013.01); *G06F 3/0656* (2013.01); *G06F 3/0679* (2013.01)

(58) Field of Classification Search
CPC .. G06F 12/0246; G06F 3/0619; G06F 3/0656; G06F 3/0679
See application file for complete search history.

(56) References Cited

U.S. PATENT DOCUMENTS

| | | | |
|---|---|---|---|
| 2008/0189490 A1* | 8/2008 | Cheon ................ | G06F 12/0246 711/144 |
| 2017/0039141 A1* | 2/2017 | Yeh ..................... | G06F 12/1009 |
| 2017/0115883 A1* | 4/2017 | Muppalaneni ...... | G06F 12/1009 |
| 2017/0132069 A1* | 5/2017 | Wang .................. | G06F 11/073 |
| 2018/0143778 A1* | 5/2018 | Yeh ..................... | G06F 3/0631 |
| 2019/0026224 A1* | 1/2019 | Koo .................... | G06F 12/0253 |

FOREIGN PATENT DOCUMENTS

| | | |
|---|---|---|
| TW | I579696 | 4/2017 |
| TW | I587135 | 6/2017 |

* cited by examiner

*Primary Examiner* — Glenn Gossage
(74) *Attorney, Agent, or Firm* — JCIPRNET

(57) ABSTRACT

A memory storage device, a memory control circuit unit and a data storage method for a rewritable non-volatile memory module are disclosed. The method includes: receiving first data; mapping a logical unit of the first data to a first physical unit in a first management unit and not storing the first data to the rewritable nonvolatile memory module if a data content of the first data is identical to a data content of second data stored in the first physical unit. The method also includes storing logical-to-physical bit map information to a second physical unit in the first management unit, wherein the logical-to-physical bit map information corresponds to at least one logical-to-physical mapping table and is configured for identifying valid data in the first management unit. Identifiers or symbols of data content may be compared to determine if first and second data are identical. A log table in a buffer memory may be updated to record mapping information, which may be stored in a physical unit in the first management unit.

18 Claims, 14 Drawing Sheets

MEMORY STORAGE DEVICE, CONTROL CIRCUIT UNIT AND METHOD INCLUDING STORING LOGICAL-TO-PHYSICAL TABLE BIT MAP INFORMATION IN A MANAGEMENT UNIT AND NOT STORING IDENTICAL DATA CONTENT

CROSS-REFERENCE TO RELATED APPLICATION

This application claims the priority benefit of Taiwan application serial no. 106125239, filed on Jul. 27, 2017. The entirety of the above-mentioned patent application is hereby incorporated by reference herein and made a part of this specification.

BACKGROUND

Technical Field

The invention relates to a data management technique, and more particularly, to a data storage method, a memory control circuit unit and a memory storage device.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In general, when storing data to a memory storage device, the data to be stored may be compressed first to reduce an amount of the data. However, in most of the existing data storage mechanisms, it is still required to store the compressed data to the memory storage device in a non-volatile manner, so as to ensure that the data can be recovered later or ensure that data loss due to power failure during the writing process can be prevented. In addition, theoretically, any data written to the memory storage device belongs to one logical address. Accordingly, in the existing mechanisms, if one specific data is treated as already being stored in the memory storage device but is not actually stored, an issue regarding mapping relation between a logical address and a physical address will also arise.

Nothing herein should be construed as an admission of knowledge in the prior art of any portion of the present invention. Furthermore, citation or identification of any document in this application is not an admission that such document is available as prior art to the present invention, or that any reference foul's a part of the common general knowledge in the art.

SUMMARY

An exemplary embodiment of the invention provides a data storage method, a memory control circuit unit and a memory storage device, which are capable of improving data storage efficiency.

An exemplary embodiment of the invention provides a data storage method for a rewritable non-volatile memory module. The rewritable non-volatile memory module includes a plurality of management units. The management units include a first management unit, and the data storage method includes: receiving first data; mapping a logical unit of the first data to a first physical unit of the first management unit and not storing the first data to the rewritable non-volatile memory module if a data content of the first data is identical to a data content of second data, wherein the second data is stored in the first physical unit; and storing logical-to-physical bit map information to a second physical unit in the first management unit, wherein the logical-to-physical bit map information corresponds to at least one logical-to-physical mapping table, and the at least one logical-to-physical mapping table is configured for identifying valid data in the first management unit.

Another exemplary embodiment of the invention provides a memory storage device, which includes a connection interface unit, a rewritable non-volatile memory module and a memory control circuit unit. The connection interface unit is configured to couple to a host system. The rewritable non-volatile memory module includes a plurality of management units, wherein the management units include a first management unit. The memory control circuit unit is coupled to the connection interface unit and the rewritable non-volatile memory module. The memory control circuit unit is further configured to receive first data from the host system. The memory control circuit unit is further configured to map a logical unit of the first data to a first physical unit in the first management unit and configured not to store the first data to the rewritable non-volatile memory module if a data content of the first data is identical to a data content of second data stored in the first physical unit. The memory control circuit unit is further configured to store logical-to-physical bit map information to a second physical unit in the first management unit. The logical-to-physical bit map information corresponds to at least one logical-to-physical mapping table, and the at least one logical-to-physical mapping table is configured for identifying valid data in the first management unit.

Another exemplary embodiment of the invention provides a memory control circuit unit, which is configured to control a rewritable non-volatile memory module. The rewritable non-volatile memory module includes a plurality of management units. The management units include a first management unit. The memory control circuit unit includes a host interface, a memory interface, a buffer memory and a memory management circuit. The host interface is configured to couple to a host system. The memory interface is configured to couple to a rewritable non-volatile memory module. The memory management circuit is coupled to the host interface, the memory interface and the buffer memory. The memory management circuit is further configured to receive first data from the host system. The memory management circuit is further configured to map a logical unit of the first data to a first physical unit in the first management unit and configured not to store the first data to the rewritable non-volatile memory module if a data content of the first data is identical to a data content of second data stored in the first physical unit. The memory management circuit is further configured to store logical-to-physical bit map information to a second physical unit in the first management unit. The logical-to-physical bit map information corresponds to at least one logical-to-physical mapping table, and the at least one logical-to-physical mapping table is configured for identifying valid data in the first management unit.

Based on the above, after the first data is received, if the data content of the first data is identical to the data content of the second data stored in the first physical unit, the logical unit of the first data is then mapped to the first physical unit. However, the first data is not stored to the rewritable non-volatile memory module. In addition, the logical-tophysical bit map information is further stored to the first management unit including the first physical unit. The logical-to-physical bit map information corresponds to at least one logical-to-physical mapping table and is configured for identifying valid data in the first management unit. Accordingly, not only can the storage for data with the identical data content be reduced, the data can also be managed efficiently.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
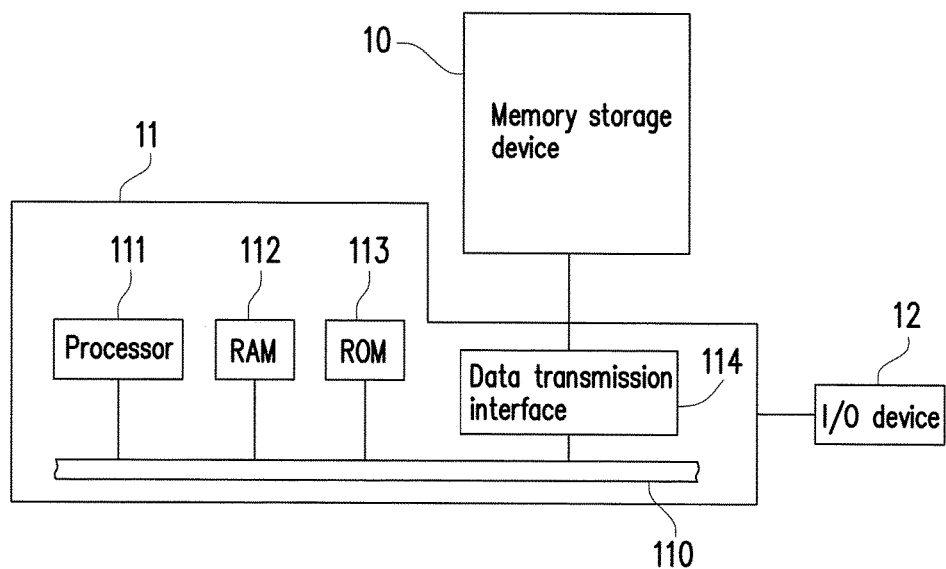
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
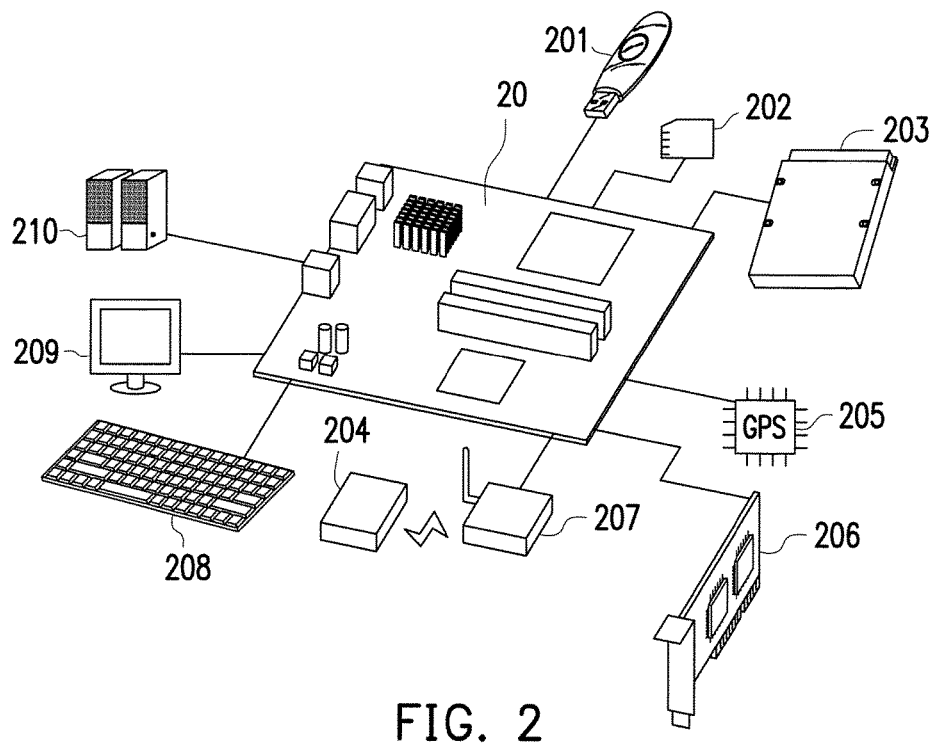
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

Referring to FIG. 1 and FIG. 2, in the present exemplary embodiment, the processor 111, the RAM 112, the ROM 113 and the data transmission interface 114 may be disposed on a main board 20 of the host system 11. The number of data transmission interfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a BLUETOOTH memory storage device, a BLE (Bluetooth low energy) memory storage device (e.g., iBeacon™) Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
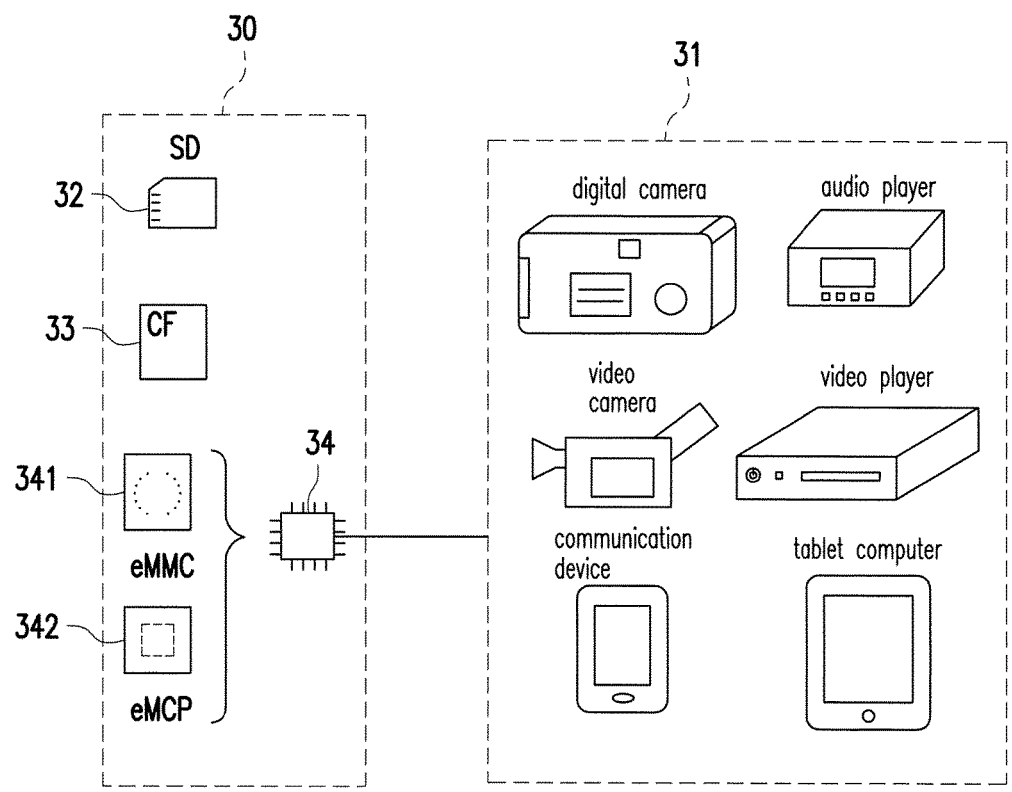
FIG. 3 is a schematic diagram illustrating a host system and a memory storage device according to another exemplary embodiment of the invention.

In an exemplary embodiment, the aforementioned host system may be any system capable of substantially cooperating with the memory storage device for storing data. Although the host system is illustrated as a computer system in the foregoing exemplary embodiments, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (SECURE DIGITAL) card 32, a CF (COMPACT FLASH) card 33 or an embedded storage device 34. The embedded storage device 34 may include various embedded storage devices capable of directly coupling a memory module onto a substrate of the host system, such as an eMMC (EMBEDDED MULTI MEDIA CARD) 341 and/or an eMCP (EMBEDDED MULTI CHIP PACKAGE) storage device 342.

Figure 4:
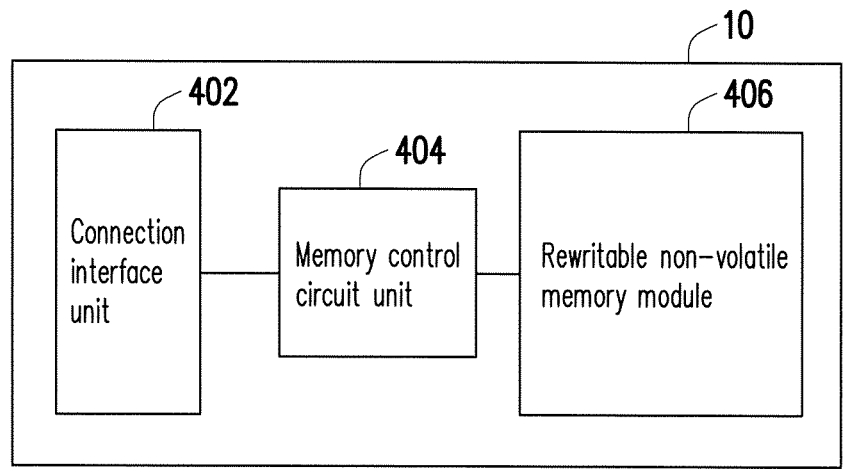
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit (MCC) unit 404 and a rewritable non-volatile memory (RNVM) module 406.

The connection interface unit 402 is configured to couple the memory storage device 10 to the host system 11. In the present exemplary embodiment, the connection interface unit 402 is compatible with a SATA (Serial Advanced Technology Attachment) standard. Nevertheless, it should be understood that the invention is not limited to the above. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 may be distributed outside of a chip containing the memory control circuit unit 404.

The memory control circuit unit 404 is configured to implement a plurality of logic gates or execute control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. The amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the rewritable non-volatile memory module 406 has a plurality of storage states depending on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units (PPUs), and the physical programming units constitute a plurality of physical erasing units (PEUs). Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. When the physical programming units are physical pages, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8 or 16 sectors, or a different number (more or less) of physical sectors, and the size of each physical sector may also be greater or smaller. On the other hand, the physical erasing unit (PEU) is the minimum unit for erasing. Namely, each physical erasing unit contains the least number of memory cells to be erased together. For instance, the physical erasing unit is a physical block.

Figure 5:
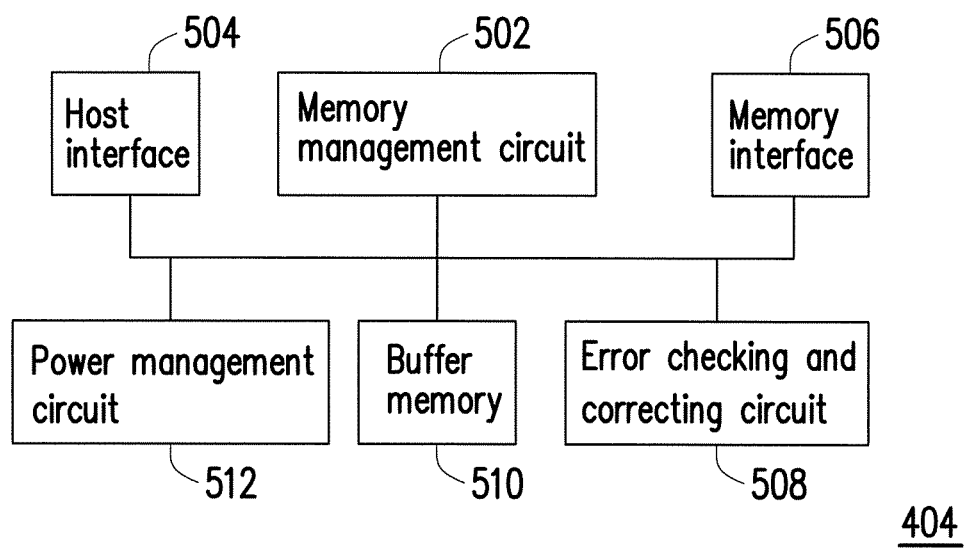
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit (MCC) unit 404 includes a memory management circuit (MMC) 502, a host interface 504 and a memory interface 506.

The memory management circuit 502 is configured to control overall operations of the memory control circuit unit 404. Specifically, the memory management circuit 502 executes a plurality of control commands to perform various operations such as writing, reading and erasing data during operation of the memory storage device 10. Hereinafter, operation of the memory management circuit 502 is described as equivalent to describe operation of the memory control circuit unit 404.

In the present exemplary embodiment, the control commands of the memory management circuit 502 are implemented in a firmware form. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), a read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in hardware form. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give a command sequence of other types to the rewritable non-volatile memory module 406 for instructing the rewritable non-volatile memory module 406 to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA (Serial Advanced Technology Attachment) standard. Nevertheless, it should be understood that the invention is not limited to the above. The host interface 504 may also compatible with the PATA standard, the IEEE 1394 standard, the PCI Express standard, the USB (Universal Serial Bus) standard, the SD standard, the UHS-I (Ultra High Speed-I) standard, the UHS-II standard, the MS (Memory Stick) standard, the MMC standard, the eMMC standard, the UFS (Universal Flash Storage) standard, the CF (Compact Flash) standard, the IDE (Integrated Device Electronics) standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs a data writing, the read command sequence which instructs a data reading, the erase command sequence which instructs a data erasing, and other corresponding command sequences for instructing to perform various memory operations (e.g., changing read voltage levels or performing a garbage collection operation). These command sequences are generated by the memory management circuit 502 and transmitted to the rewritable non-volatile memory module 406 through the memory interface 506, for example. The command sequences may include one or more signals, or data transmitted on the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control power of the memory storage device 10.

Figure 6:
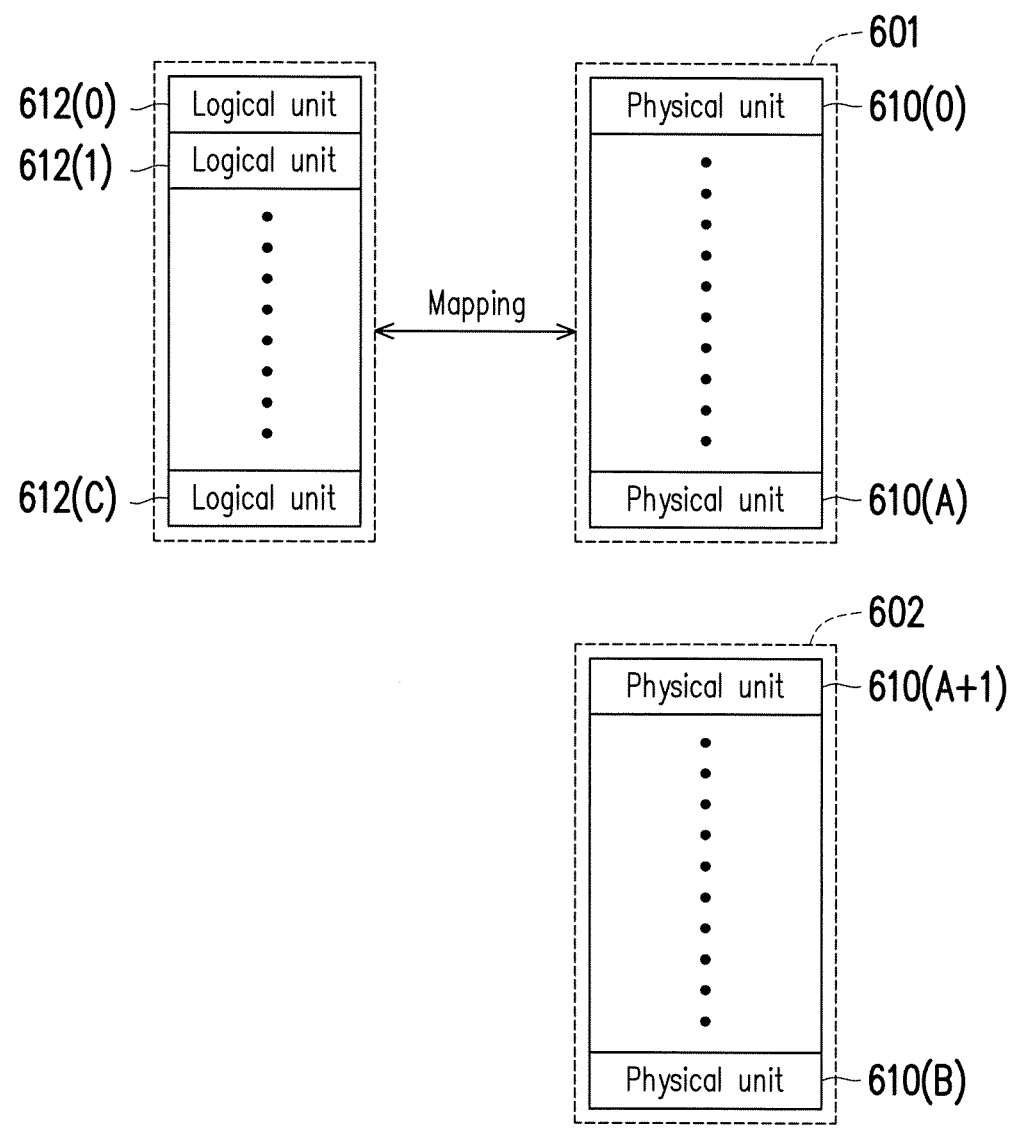
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention.

Referring to FIG. 6, the memory management circuit 502 (FIG. 5) logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is treated as a damaged physical unit. It should be noted that, if there are no available physical units (erasing units) in the replacement area 602, the memory management circuit 502 may declare the memory storage device 10 as being in a write protect state so data can no longer be written thereto.

The memory management circuit 502 manages physical units in management units, and each of the management units includes multiple management units. In this exemplary embodiment, one management unit includes one or more physical erasing units, and one physical unit refers to one physical programming unit. However, in another exemplary embodiment, one physical unit may also refer to one physical address or a composition of a plurality of continuous or discontinuous physical addresses. The memory management circuit 502 assigns logical units 612(0) to 612(C) for mapping to the physical units 610(0) to 610(A) in the storage area 601. In the present exemplary embodiment, each logical unit refers to one logical address. However, in another exemplary embodiment, each logical unit may also refer to one logical programming unit or a composition of a plurality of continuous or discontinuous logical addresses. In addition, each of the logical units 612(0) to 612(C) may also be mapped to one or more physical units.

The memory management circuit 502 records a mapping relation (a.k.a. a logical-to-physical address mapping relation) between the logical units and the physical units into at least one logical-to-physical mapping table. When the host system 11 intends to read the data from the memory storage device 10 or write the data into the memory storage device 10, the memory management circuit 502 can perform a data accessing operation on the memory storage device 10 according to the logical-to-physical mapping table.

It is noted that in the following description, some terms may be replaced with corresponding abbreviations for ease of reading (see Table 1).

TABLE 1

| logical-to-physical mapping table | L2P table |
| logical-to-physical bit map information | L2P bit map information |
| rewritable non-volatile memory module | RNVM module |
| physical unit | PU |
| logical unit | LU |
| memory management circuit | MMC |

Figure 7A:
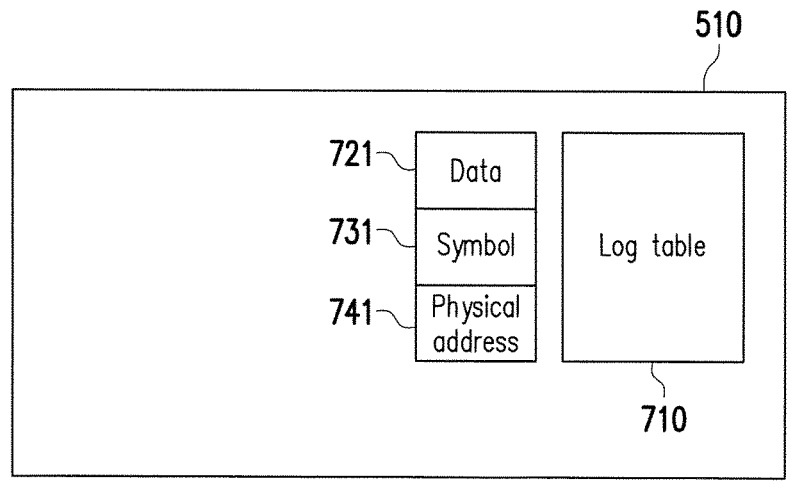
FIG. 7A is a schematic diagram illustrating a buffer memory storing data with an associated symbol or identifier, and a log table or information, which may be used in a data storage operation according to an exemplary embodiment of the invention.
Figure 7B:
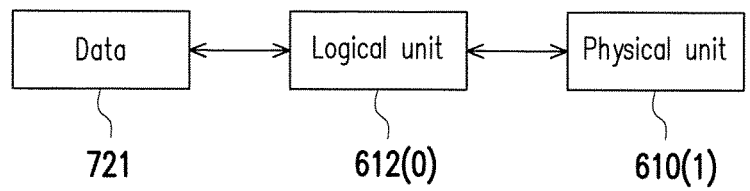
FIG. 7B is a schematic diagram illustrating a mapping relation between a logical unit and a physical unit according to an exemplary embodiment of the invention.
Figure 7C:
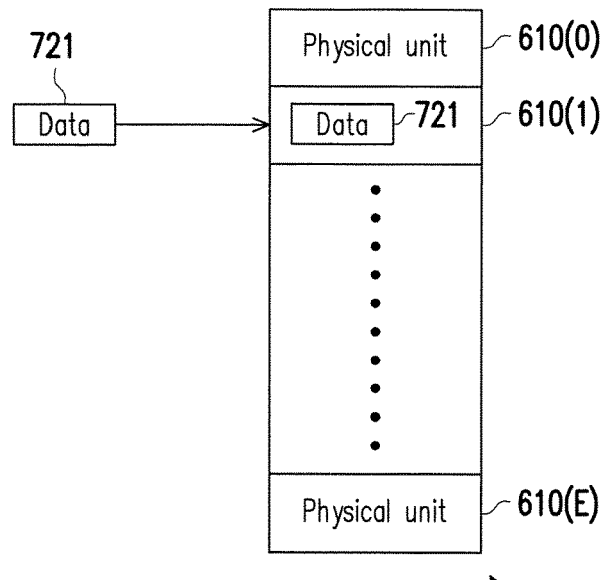
FIG. 7C is a schematic diagram illustrating a management unit including a plurality of physical units according to an exemplary embodiment of the invention.

FIG. 7A, FIG. 7B and FIG. 7C are schematic diagrams illustrating a data storage operation according to an exemplary embodiment of the invention.

With reference to FIG. 7A, FIG. 7B and FIG. 7C, the MMC 502 (FIG. 5) temporarily stores a log table 710 in the buffer memory 510. The MMC 502 receives a write command and data 721 corresponding to the write command from the host system 11. For example, the write command is an instruction for storing the data 721 to the memory storage device 10. The MMC 502 performs a symbol generating operation on the data 721 so as to generate a symbol 731 corresponding to the data 721. The symbol 731 is also known as an identifier of the data 721, and the symbol 731 can be used to represent the data 721. The symbol 731 is generated based on a data content of the data 721. In general, if the data contents of two data are identical, it is highly possible that the identifiers of these two data are identical. However, under certain circumstances, even if the data contents of two data are identical, the identifiers of these two data may still be different.

In an exemplary embodiment, the identifier of one specific data is a CRC (Cyclic Redundancy Check) code generated from a calculation based on the data content of that specific data. Nonetheless, in another exemplary embodiment, the identifier of one specific data may also be a hash code or other symbols that can be used for identifying data with different data contents.

If the data 721 belongs to the LU 612(0), the MMC 502 then maps the LU 612(0) to the PU 610(1). For example, a mapping relation between the LU 612(0) and the PU 610(1) may be as shown in FIG. 7B. The MMC 502 temporarily stores the data 721, the symbol 731 and a physical address 741 to the buffer memory 510. Among them, the physical address 741 is the physical address of the PU 610(1). The MMC 502 writes the data 721 into the PU 610(1). It should be noted that, each of the PUs 610(0) to 610(E) is included in a management unit 750.

Figure 8A:
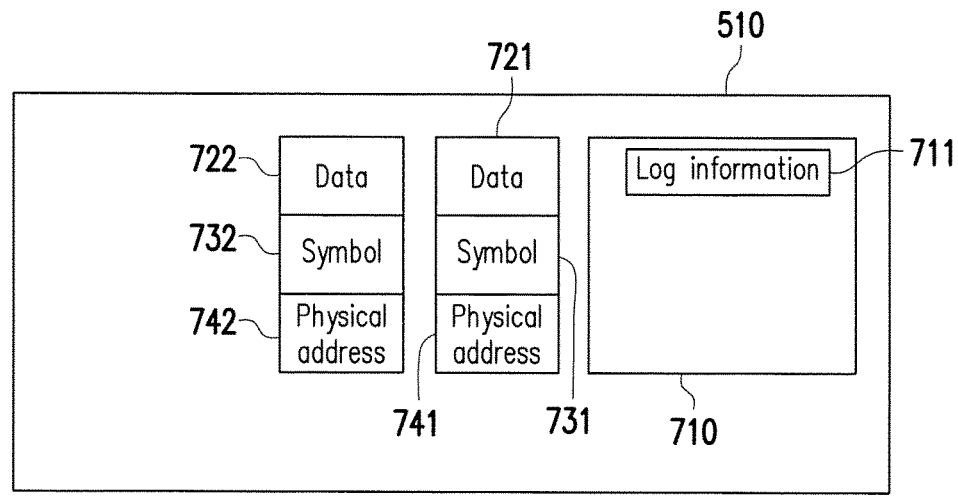
FIG. 8A is a schematic diagram illustrating a buffer memory storing data with an associated symbol or identifier, and a log table or information, which may be used in a data storage operation according to an exemplary embodiment of the invention.
Figure 8B:
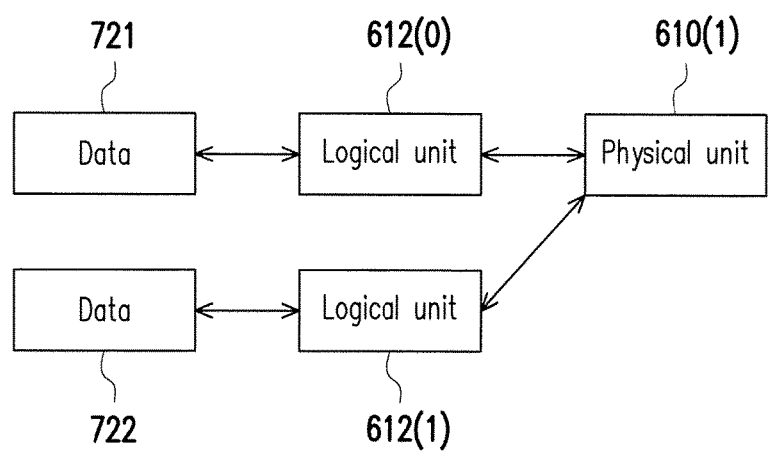
FIG. 8B is a schematic diagram illustrating a mapping relation between logical units and a physical unit according to an exemplary embodiment of the invention.

FIG. 8A and FIG. 8B are schematic diagrams illustrating a data storage operation according to another exemplary embodiment of the invention.

With reference to FIG. 8A and FIG. 8B, the MMC 502 (FIG. 5) receives another write command and data 722 corresponding to this write command from the host system 11. For example, the write command is an instruction for storing the data 722 to the memory storage device 10. The MMC 502 generates a symbol 732 corresponding to the data 722. The symbol 732 is an identifier of the data 722.

The MMC 502 determines whether the data content of the data 721 is identical to a data content of the data 722. In an exemplary embodiment, the MMC 502 compares the symbol 731 with the symbol 732. If the symbols 731 and 732 are identical, the MMC 502 compares the data 721 with the data 731. If the data 721 is identical to the data 722, the MMC 502 determines that the data content of the data 721 is identical to the data content of the data 722. Otherwise, if the symbols 731 and 732 are different or the data 721 and the data 722 are different, the MMC 502 determines that the data content of the data 721 is different from the data content of the data 722. Alternatively, in another exemplary embodiment, if the symbols 731 and 732 are identical, the MMC 502 may also (directly) determine that the data content of the data 721 is identical to the data content of the data 722. Alternatively, in another exemplary embodiment, the MMC 502 may also (directly) compare the data 721 with the data 722 without comparing the symbol 731 with the symbol 732.

In an exemplary embodiment of FIG. 8B, it is assumed that the data content of the data 721 is identical to the data content of the data 722, and the data 722 belongs to the LU 612(1). The MMC 502 maps the LU 612(1) to the PU 610(1). It should be noted that, in this case, the LUs 612(0) and 612(1) are both mapped to the PU 610(1), as shown in FIG. 8B. Besides, the MMC 502 temporarily stores the data 722, the symbol 732 and a physical address 742 to the buffer memory 510. Among them, the physical address 742 is also the physical address of the PU 610(1), and the physical addresses 741 and 742 are identical.

In correspondence to the data content of the data 721 being identical to the data content of the data 722, the MMC 502 further updates the log table 710 in the buffer memory 510. For example, the MMC 502 records log information 711 to the log table 710. The log information 711 includes mapping information between the LU 612(1) and the PU 610(1) (e.g., the physical address 742). Further, in correspondence to the data content of the data 721 being identical to the data content of the data 722, the MMC 502 does not write the data 722 into the PU 610(1). Moreover, the data 722 is not stored to the management unit 750 or the other PUs in the RNVM module 406 either.

In an exemplary embodiment of FIG. 8A, if an instruction for reading the data of the LU 612(1) is received from the host system 11, the MMC 502 can search the log information 711 in the log table 710, so as to obtain the physical address 742 mapped to the LU 612(1). Then, the MMC 502 can transmit the data 722 currently temporarily stored in the buffer memory 510 according to the physical address 742. Alternatively, in an exemplary embodiment, if the data 722 is already deleted from the buffer memory 510, the MMC 502 can read the data from the PU 610(1) according to the physical address 742 and transmit the read data to the host system 11.

In an exemplary embodiment, if an instruction for reading the data of the LU 612(1) is received from the host system 11, the MMC 502 can search a L2P table to obtain the physical address mapped to the LU 612(1). Then, the MMC 502 compares the searched physical address with the physical address 742 mapped to the LU 612(1) in the log information 711. If the searched physical address is identical to the physical address 742, the MMC 502 can transmit the data 722 currently temporarily stored in the buffer memory 510 to the host system 11, or read the data from the PU 610(1) and transmit the read data to the host system 11, depending on whether the data 722 currently exists in the buffer memory 510 or not.

Figure 9A:
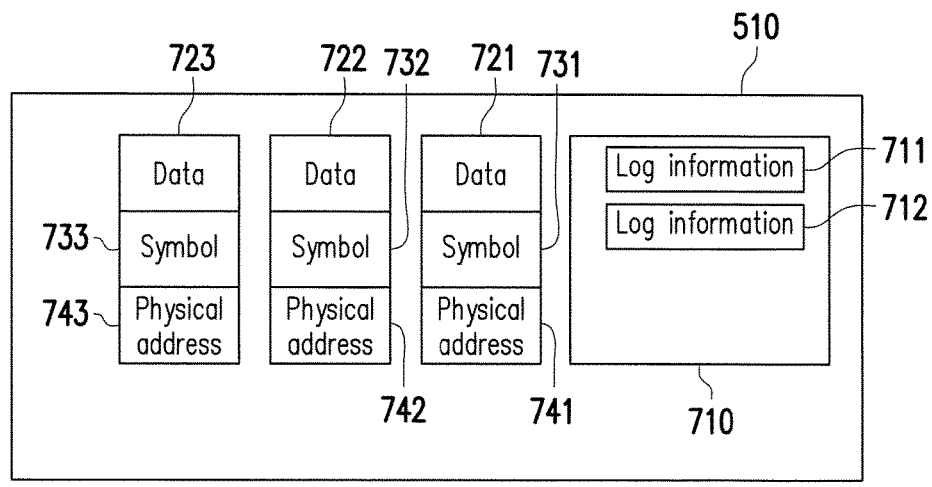
FIG. 9A is a schematic diagram illustrating a buffer memory storing data with an associated symbol or identifier, and a log table or information, which may be used in a data storage operation according to an exemplary embodiment of the invention.
Figure 9B:
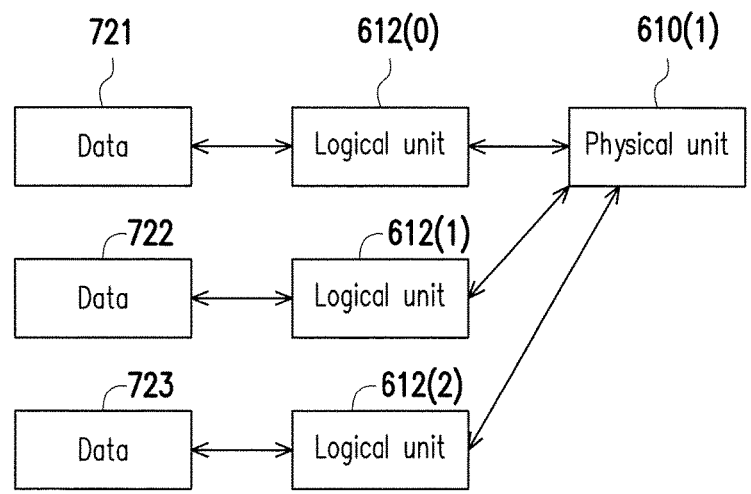
FIG. 9B is a schematic diagram illustrating a mapping relation between logical units and a physical unit according to an exemplary embodiment of the invention.

FIG. 9A and FIG. 9B are schematic diagrams illustrating a data storage operation according to another exemplary embodiment of the invention.

With reference to FIG. 9A and FIG. 9B, the MMC 502 (FIG. 5) receives another write command and data 723 corresponding to this write command from the host system 11. Then, the MMC 502 generates a symbol 733 corresponding to the data 723. The symbol 733 is an identifier of the data 723.

The MMC 502 determines whether the data content of the data 721 is identical to a data content of the data 723. For example, the MMC 502 can compare whether the symbols 731 and 733 are identical and/or compare whether the data 721 and 723 are identical, so as to determine whether the data content of the data 721 is identical to the data content of the data 723.

In an exemplary embodiment of FIG. 9B, it is assumed that the data content of the data 721 is identical to the data content of the data 723, and the data 723 belongs to the LU 612(2). The MMC 502 maps the LU 612(2) to the PU 610(1). It should be noted that, in this case, the LUs 612(0), 612(1) and 612(2) are all mapped to the PU 610(1), as shown in FIG. 9B. Besides, the MMC 502 temporarily stores the data 723, the symbol 733 and a physical address 743 to the buffer memory 510. Among them, the physical address 743 is also the physical address of the PU 610(1), and the physical addresses 741, 742 and 743 are identical.

In correspondence to the data content of the data 721 being identical to the data content of the data 723, the MMC 502 updates the log table 710 in the buffer memory 510 by recording log information 712 to the log table 710. The log information 712 includes mapping information between the LU 612(2) and the PU 610(1) (e.g., the physical address 743). Further, in correspondence to the data content of the data 721 being identical to the data content of the data 723, the MMC 502 does not write the data 723 into the PU 610(1) or the other PUs in the RNVM module 406.

In an exemplary embodiment of FIG. 9A, if an instruction for reading the data of the LU 612(2) is received from the host system 11, the MMC 502 can search the log information 712 in the log table 710 in order to transmit the data 723 currently temporarily stored in the buffer memory 510 to the host system 11. Alternatively, if the data 723 is already deleted from the buffer memory 510, the MMC 502 can read the data from the PU 610(1) according to the physical address 743 and transmit the read data to the host system 11.

Figure 10A:
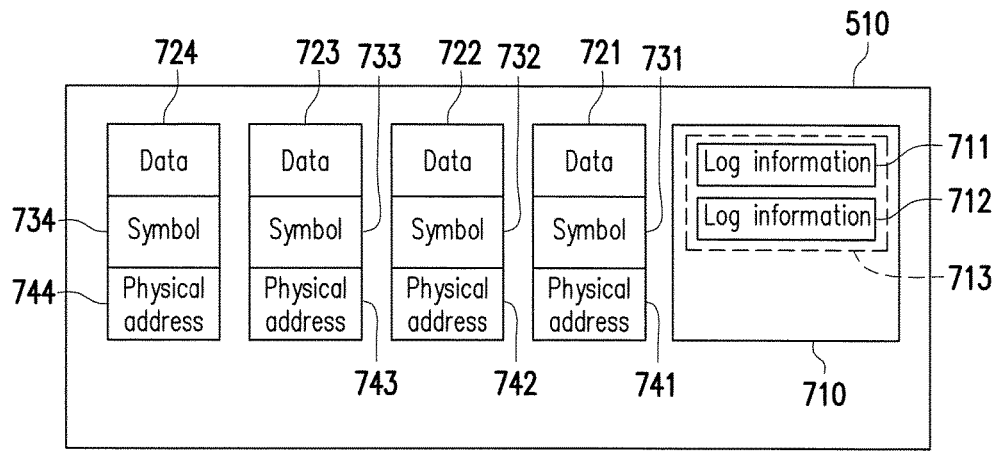
FIG. 10A is a schematic diagram illustrating a buffer memory storing data with an associated symbol or identifier, and a log table or information, which may be used in a data storage operation according to an exemplary embodiment of the invention.
Figure 10B:
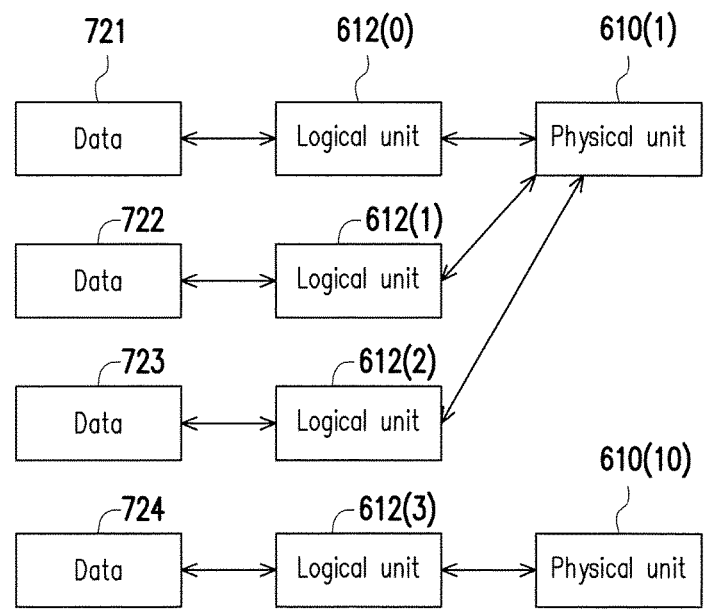
FIG. 10B is a schematic diagram illustrating a mapping relation between logical units and physical units according to an exemplary embodiment of the invention.
Figure 10C:
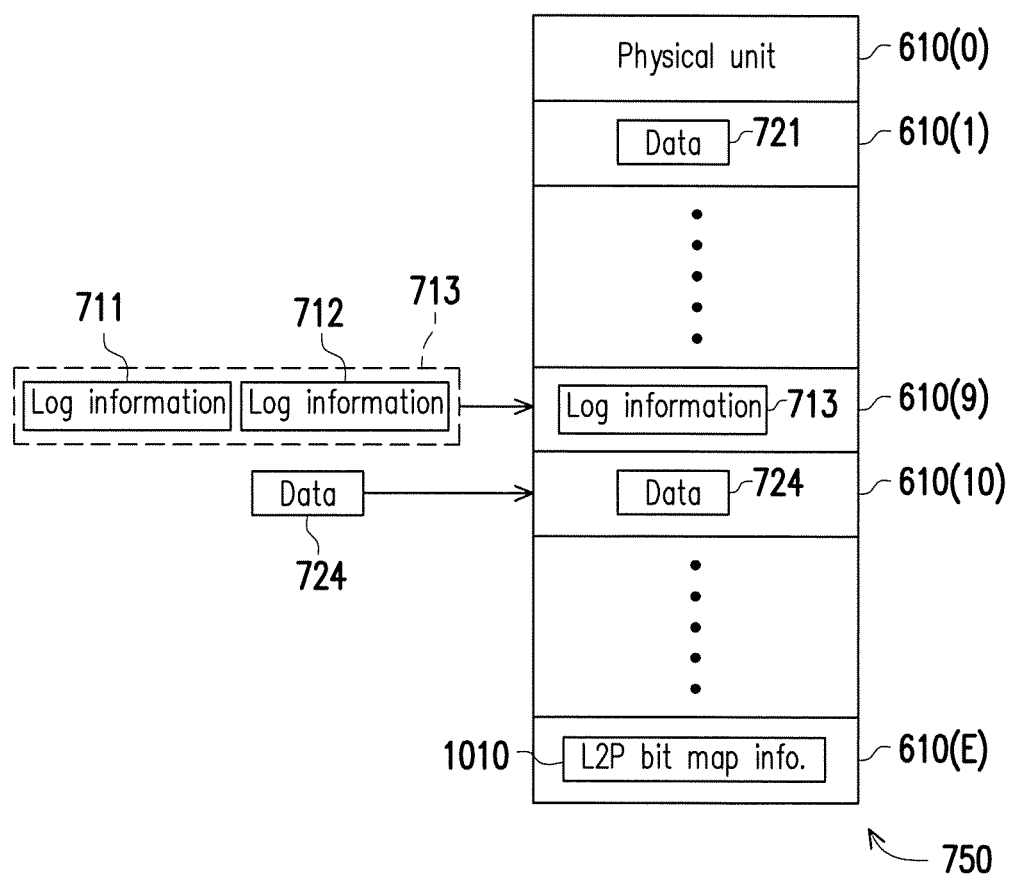
FIG. 10C is a schematic diagram illustrating a management unit including a plurality of physical units according to an exemplary embodiment of the invention.

FIG. 10A, FIG. 10B and FIG. 10C are schematic diagrams illustrating a data storage operation according to an exemplary embodiment of the invention.

With reference to FIG. 10A, FIG. 10B and FIG. 10C, the MMC 502 (FIG. 5) receives another write command and data 724 corresponding to the write command from the host system 11. Then, the MMC 502 generates a symbol 734 corresponding to the data 724. The symbol 734 is an identifier of the data 724.

The MMC 502 determines whether the data content of the data 724 is identical to a data content of data in the buffer memory 510. Taking the data 721 currently temporarily stored in the buffer memory 510 for example, the MMC 502 can compare the symbol 731 with the symbol 734 and/or compare the data 721 with the data 724, so as to determine whether the data content of the data 724 is identical to the data content of the data 721.

In an exemplary embodiment of FIG. 10B, it is assumed that data with a data content identical to the data content of the data 724 does not exist in the buffer memory 510, and the data 724 belongs to the LU 612(3). The MMC 502 maps the LU 612(3) to the PU 610(10). Here, the PU 610(10) is also included in the management unit 750. In this case, the LUs 612(0), 612(1) and 612(2) are all mapped to the PU 610(1), whereas the LU 612(3) is mapped to the PU 610(10), as shown in FIG. 10B. The MMC 502 also temporarily stores the data 724, the symbol 734 and a physical address 744 to the buffer memory 510. Among them, the physical address 744 is the physical address of the PU 610(10). In addition, in correspondence to absence of the data with the data content identical to the data content of the data 724 in the buffer memory 510, the MMC 502 stores the data 724 to the PU 610(10).

In an exemplary embodiment, before the data 724 is stored to the PU 610(10), the MMC 502 first stores log information 713 in the log table 710 to the PU 610(9), as shown in FIG. 10C. For example, the log information 713 includes the log information 711 and 712. After the log information 713 is stored to the PU 610(9), the data 724 can be stored to the PU 610(10). In this way, even if power failure occurs when the PU 610(10) is programmed to store the data 724, the log information 713 can still be read from the PU 610(9). According to the read log information 713, the log table 710 in the buffer memory 510 lost due to power failure can be recovered. In addition, because the log information 713 is already stored in the PU 610(9), even if programming failure occurs on the PU 610(10), a correctness of the stored log information 713 can still remain unaffected.

In an exemplary embodiment of FIG. 10A to FIG. 10C, the symbols 731 to 734 may also be recorded in the log table 710, and the log information 713 stored to the management unit 750 (or the PU 610(9)) further includes the symbols 731 to 734. Accordingly, even if the symbol 731 to 734 is removed from the buffer memory 510, the symbols 731 to 734 can still be re-obtained from the stored log information 713.

It should be noted that, in an exemplary embodiment of the FIG. 10C, a serial number of the PU 610(10) is arranged after a serial number of the PU 610(9), but the invention is not limited thereto. In another exemplary embodiment, the data 724 may also be stored in any one PU among the PUs 610(10) to 610(E), as long as a serial number of the PU for storing the data 724 is arranged after the serial number of the PU 610(9) for storing the log information 713. In addition, each of the PUs 610(0) to 610(E) belongs to the same management unit 750.

In an exemplary embodiment, the MMC 502 determines whether the log table 710 in the buffer memory 510 is filled. If the log table 710 is filled, the MMC 502 stores the information (e.g., the log information 713) in the log table 710 to the RNVM module 406 and empties the log table 710 in order to write new information into the log table 710. Alternatively, if the log table 710 is not filled yet, the MMC 502 may not store the information in the log table 710 to the RNVM module 406, such that a writing frequency for the RNVM module 406 may be lowered.

It should be noted that, generally, when managing one specific physical block, the memory storage device stores physical-to-logical mapping information to that specific physical block. The physical-to-logical mapping information can reflect a physical-to-logical mapping relation for all the data stored in that specific physical block. For example, the physical-to-logical mapping information can reflect that one specific physical address in the physical block is being mapped to which logical address. In a garbage collection operation, the physical-to-logical mapping information may be used in reverse searching to determine whether the data stored at one specific physical address in the physical block is valid data. For example, the physical-to-logical mapping information may indicate that a physical address A is mapped to a logical address A, but it is found that the logical address A is currently mapped to a physical address B in fact after searching the L2P table. In other words, this searching result indicates that data currently stored at the physical address A is no longer the latest data of the logical address A. Accordingly, the data currently stored at the physical address A (i.e., the old data of the logical address A) may be identified as invalid data and the data currently stored at the physical address B (i.e., the newest data of the logical address A) may be identified as the valid data. Alternatively, in the case where the physical-to-logical mapping information indicates that a physical address C is mapped to a logical address C, if it is found that the logical address C is currently mapped to the physical address C after searching the L2P table, data currently stored at the physical address C may be identified as the valid data. However, if one specific physical address is mapped to multiple logical addresses, this physical-to-logical mapping information may not work properly.

Therefore, in an exemplary embodiment of FIG. 10C, the MMC 502 further stores a L2P bit map information 1010 to the management unit 750. The L2P bit map information 1010 corresponds to at least one L2P table, and the L2P bit map information 1010 is configured for identifying the valid data in the management unit 750. For example, the L2P bit map information 1010 may be stored in the last PU 610(E) in the management unit 750. In addition, the L2P bit map information 1010 may also be updated according to the information (e.g., the mapping information between the LU 612(1) and the PU 610(1)) recorded in the log table 710.

Figure 11:
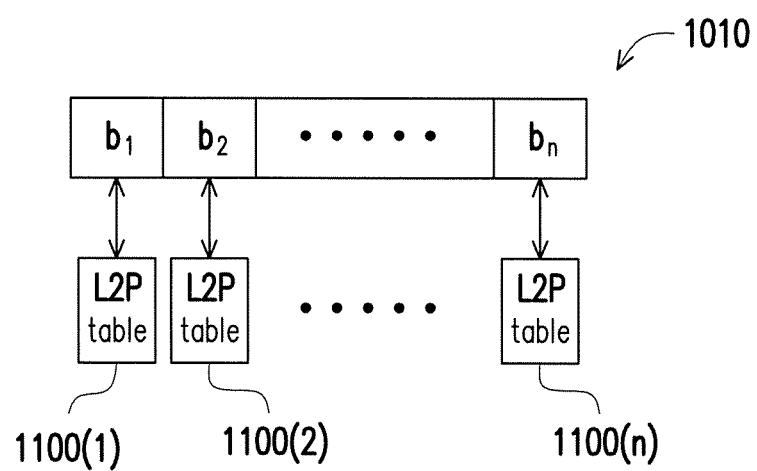
FIG. 11 is a schematic diagram illustrating logical-to-physical bit map information according to an exemplary embodiment of the invention.

FIG. 11 is a schematic diagram illustrating logical-to-physical bit map information according to an exemplary embodiment of the invention.

Referring to FIG. 10C and FIG. 11, the L2P bit map information 1010 includes a plurality of bits $b_1$ to $b_n$, and the bits $b_1$ to $b_n$ correspond to L2P tables 1100(1) to 1100(n), respectively. For example, each of the L2P tables 1100(1) to 1100(n) belongs to a part of one complete L2P table. In an exemplary embodiment, the MMC 502 updates the L2P bit map information 1010 according to a usage state of the PUs 610(0) to 610(E−1).

Taking FIG. 10B for example, if a logical-to-physical mapping relation of the LU 612(0) is recorded in the L2P table 1100(1), a logical-to-physical mapping relation of the LU 612(1) is recorded in the L2P table 1100(3), a logical-to-physical mapping relation of the LU 612(2) is recorded in the L2P table 1100(4) and a logical-to-physical mapping relation of the LU 612(3) is recorded in the L2P table 1100(7), the MMC 502 sets bit values of the bits $b_1$, $b_3$, $b_4$ and $b_7$ in the L2P bit map information 1010 as a first bit value (e.g., "1") and the bit values of the remaining bits kept at a second bit value (e.g., "0"). Later, the MMC 502 can search the L2P tables 1100(1), 1100(3), 1100(4) and 1100(7) for obtaining logical-to-physical mapping information related to the data stored in the management unit 750. If it is found that one specific LU is mapped to one particular PU in the management unit 750 after searching the related L2P table, the MMC 502 can identify the data currently stored in that particular PU as the valid data.

In other words, in the case where one PU is mapped to multiple LUs, which PUs in one management unit are stored with the valid data may be conveniently found by using the L2P bit map information, and information regarding a valid count of the management unit may be obtained accordingly. For example, the valid count of one specific management unit can reflect a total amount of the valid data stored in that specific management unit.

In an exemplary embodiment, during the garbage collection operation, the valid count of each of the management units may be obtained according to the respective L2P bit map information of these management units. Based on a set filtering condition, the valid data may be collected from specific management units (e.g., multiple management units with the smallest valid count) and then be centrally stored together. Further, the management unit in which the valid data are completely collected may be erased and released to be one spare management unit. Later, when receiving write-data from the host system 11, the spare management unit may then be used for storing the write-data. In an exemplary embodiment, multiple log information stored in different management units may be trimmed and combined in order to save a storage space for the log information.

Figure 12A:
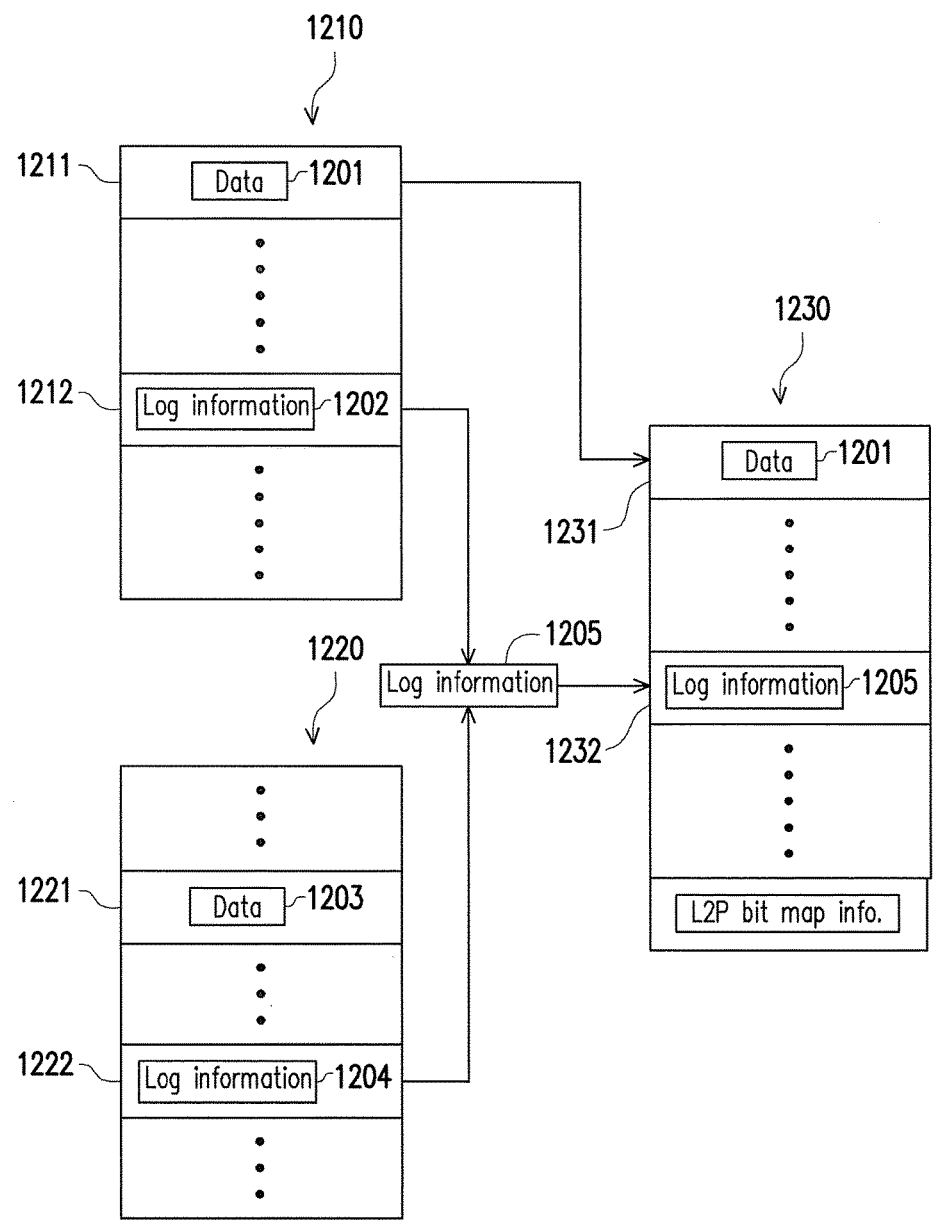
FIG. 12A and FIG. 12B are schematic diagrams illustrating a garbage collection operation according to an exemplary embodiment of the invention.
Figure 12B:
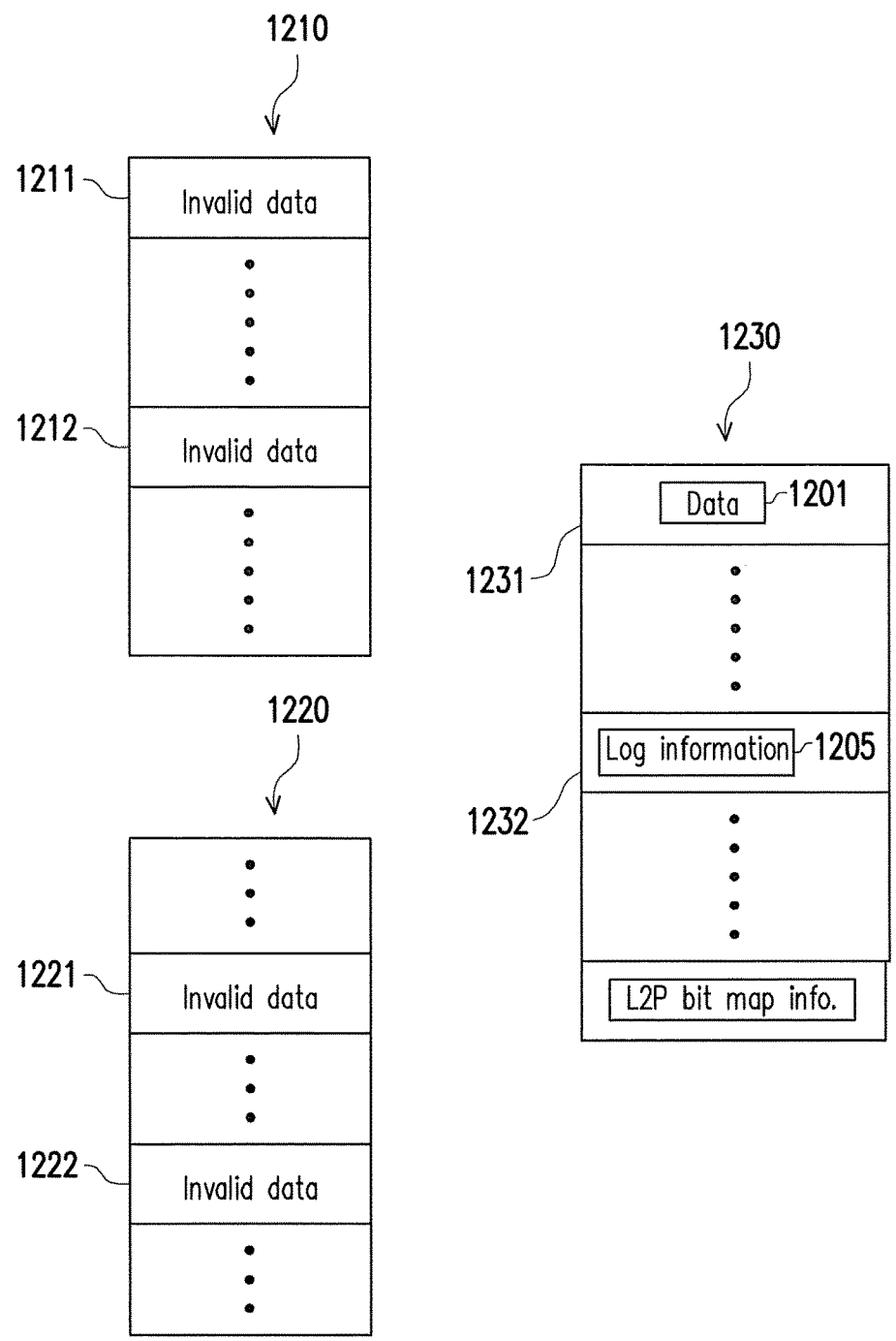

FIG. 12A and FIG. 12B are schematic diagrams illustrating a garbage collection operation according to an exemplary embodiment of the invention.

With reference to FIG. 12A, it is assumed that data 1201 is stored in a PU 1211, log information 1202 is stored in a PU 1212, data 1203 is stored in a PU 1221, log information 1204 is stored in a PU 1222, the PUs 1211 and 1212 are included in a management unit 1210, and the PUs 1221 and 1222 are included in a management unit 1220. During the garbage collection operation, the log information 1202 and the log information 1204 may be combined into log information 1205 to be stored to a PU 1232 in a management unit 1230.

It should be noted that, duplicate information in the original log information may be deleted when the log information are combined. For example, it is assumed that a data content of the data 1201 is identical to a data content of the data 1203, and each of the log information 1202 and 1204 is identical or similar to the log information 713 in FIG. 10C. Only the difference between the log information 1202 and 1204 is kept in the new log information 1205 when the log information 1202 and 1204 are combined. In addition, because the data content of the data 1201 is identical to the data content of the data 1203, only the data 1201 is stored to a PU 1231 in the management unit 1230. Further, according to the stored data, the L2P bit map information in the management unit 1230 is also updated, and description regarding the same is not repeated hereinafter.

With reference to FIG. 12B, after the related data are moved and stored in FIG. 12A, the PUs 1211, 1212, 1221 and 1222 may all be treated as not storing valid data (or the PUs 1211, 1212, 1221 and 1222 all store invalid data). Later, if the management units 1210 and 1220 do not store any valid data, the management units 1210 and 1220 may both be erased.

In an exemplary embodiment, one specific data and the identifier of that specific data are stored in the same PU or different PUs. Later, during the garbage collection operation, the identifiers of different data may be read from the PUs and compared to each other, so as to find data with the identical data content. For example, in an exemplary embodiment of FIG. 12A and FIG. 12B, an identifier of the data 1201 and an identifier of the data 1203 may be compared. If the identifier of the data 1201 is identical to the identifier of the data 1023, one of the data 1201 and the data 1203 may be (directly) treated as the invalid data. In this way, by comparing the identifiers of the different data, a data amount of valid data to be moved during the garbage collection operation can be reduced and efficiency for executing the garbage collection operation can be improved. Alternatively, in another exemplary embodiment of FIG. 12A and FIG. 12B, if the identifier of the data 1201 is identical to the identifier of the data 1203, a data content of the data 1201 and a data content of the data 1203 may be further compared, and one of the data 1201 and the data 1203 is treated as invalid data only when a comparing result shows that the data content of the data 1201 is identical to the data content of the data 1203. It should be noted that, the aforesaid operation of comparing the identifiers of the different data to filter out the data with the identical data content is performed in the garbage collection operation. Nonetheless, in another exemplary embodiment, the aforesaid operation of comparing the identifiers of the different data to filter out the data with the identical data content may also be performed when the system is idle, when a system loading is less than a loading threshold, when a data transmission bandwidth is less than a bandwidth threshold, when the power of the memory storage device is on, before the power of the memory storage device is off, or at any time point, which is not particularly limited by the invention.

Figure 13:
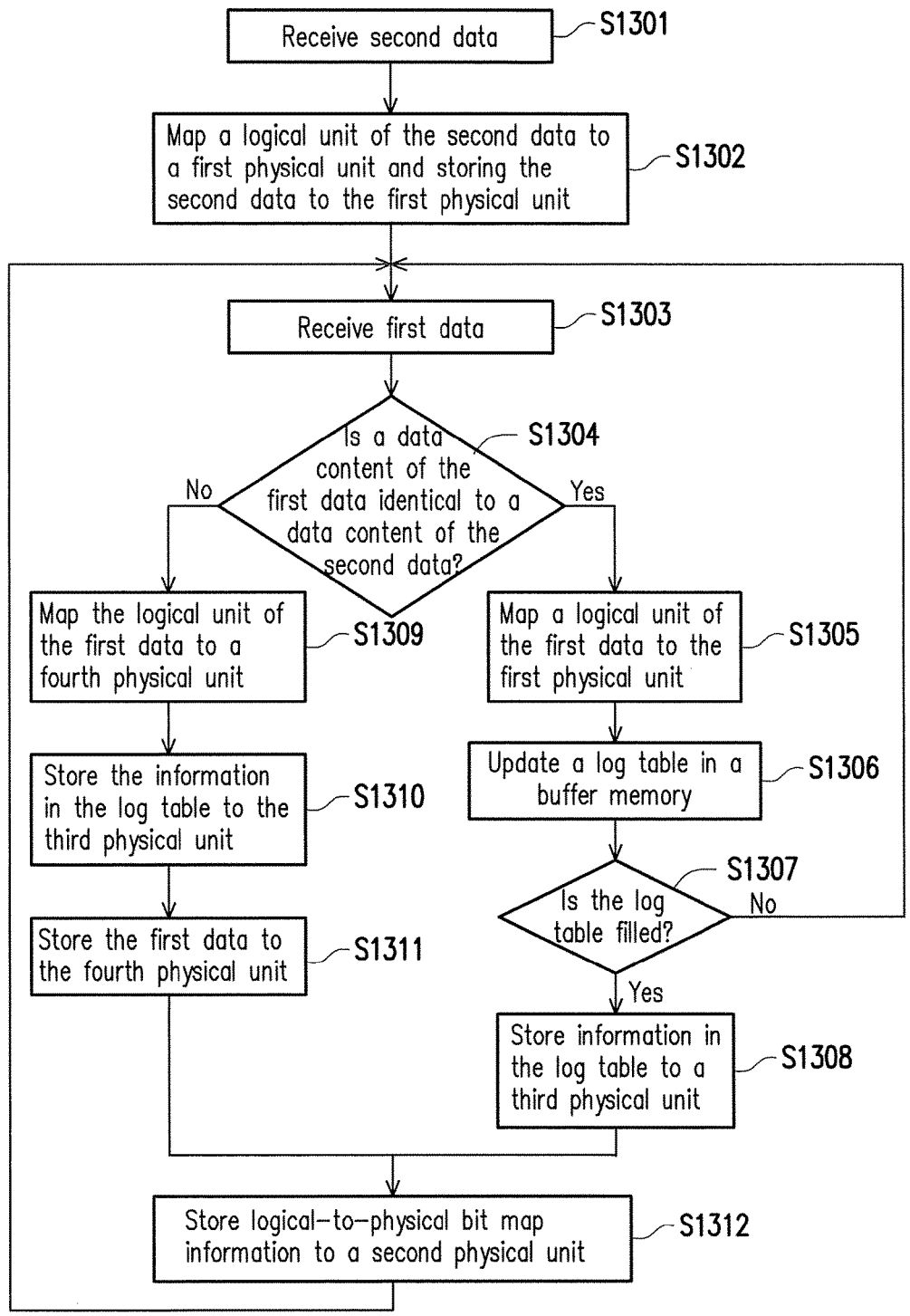
FIG. 13 is a flowchart illustrating a data storage method according to an exemplary embodiment of the invention.

FIG. 13 is a flowchart illustrating a data storage method according to an exemplary embodiment of the invention.

With reference to FIG. 13, in step S1301, second data is received from the host system. In step S1302, a LU of the second data is mapped to a first PU and the second data is stored to the first PU. In step S1303, first data is received from the host system. In step S1304, whether a data content of the first data is identical to a data content of the second data is determined. If the data content of the first data is identical to the data content of the second data, in step S1305, a LU of the first data is mapped to the first PU. In step S1306, a log table in the buffer memory is updated according to a mapping relation between the LU of the first data and the first PU. In step S1307, whether the log table in the buffer memory is filled is determined. If the log table in the buffer memory is not yet filled, the process returns to step S1303. If the log table in the buffer memory is filled, information in the log table is stored to a third PU, in step S1308.

On the other hand, if the determination in step S1304 is "No" (i.e., the data content of the first data is different from the data content of the second data), in step S1309, the LU of the first data is mapped to a fourth PU. In step S1310, the information in the log table of the buffer memory is stored to the third PU. After the information in the log table is stored to the third PU, the first data is stored to the fourth PU, in step S1311. It should be noted, by executing step S1311 after step S1310 is completed, the log table temporarily stored in the buffer memory may be prevented from being lost due to power failure or programming failure occurring when step S1311 is executed. In step S1312, L2P bit map information is stored to a second PU.

Figure 14:
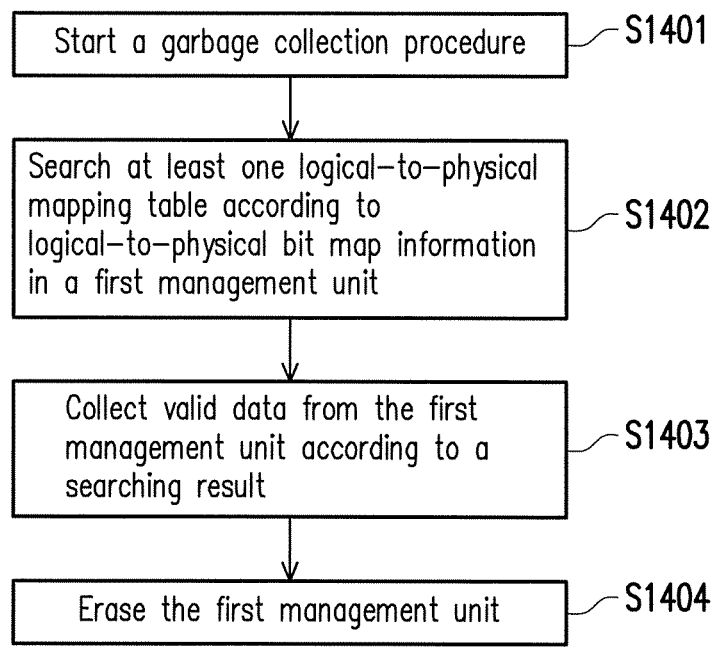
FIG. 14 is a flowchart illustrating a data storage method according to another exemplary embodiment of the invention.

FIG. 14 is a flowchart illustrating a data storage method according to another exemplary embodiment of the invention.

With reference to FIG. 14, in step S1401, a garbage collection procedure is started. In step S1402, at least one L2P table is searched according to L2P bit map information in a first management unit. In step S1403, valid data is collected from the first management unit according to a searching result. In step S1404, the first management unit is erased.

It should be noted that, the terms "first", "second" and the like are added in front of data, PUs, management units for illustrative convenience in the exemplary embodiments of FIG. 13 and FIG. 14, and their actual operation details and specific corresponding elements may refer to the exemplary embodiments of FIG. 7A to FIG. 12B. Nevertheless, each of the steps depicted in FIG. 13 and FIG. 14 have been described in detail as above, thus related description thereof is not repeated hereinafter. It should be noted that, the steps depicted in FIG. 13 and FIG. 14 may be implemented as a plurality of program codes or circuits, which are not particularly limited in the invention. Moreover, the methods disclosed in FIG. 13 and FIG. 14 may be implemented with reference to above embodiments, or may be implemented separately, which are not particularly limited in the invention.

In summary, after the first data is received, if the data content of the first data is identical to the data content of the second data stored in the first PU, the LU physical unit (PU), the logical unit (LU) of the first data is then mapped to the first PU. However, the first data is not stored to the rewritable non-volatile memory (RNVM) module. In addition, the logical-to-physical (L2P) bit map information is further stored to the first management unit including the first PU. The L2P bit map information corresponds to at least one L2P table and is configured for identifying valid data in the first management unit. As a result, data storage efficiency of the memory storage device can be improved.

The previously described exemplary embodiments of the present disclosure have the advantages aforementioned, wherein the advantages aforementioned are not required in all versions of the disclosure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data storage method for a rewritable non-volatile memory module, wherein the rewritable non-volatile memory module comprises a plurality of management units, the management units comprise a first management unit, and the data storage method comprises:

receiving first data;

mapping a logical unit of the first data to a first physical unit in the first management unit and not storing the first data to the rewritable non-volatile memory module if a data content of the first data is identical to a data content of second data stored in the first physical unit;

storing logical-to-physical bit map information to a second physical unit in the first management unit, wherein the logical-to-physical bit map information corresponds to at least one logical-to-physical mapping table, and the at least one logical-to-physical mapping table is configured for identifying valid data in the first management unit;

mapping the logical unit of the first data to a fourth physical unit in the first management unit if the data content of the first data is different from the data content of the second data;

storing information in a log table to a third physical unit in the first management unit; and storing the first data to the fourth physical unit after the information in the log table is stored to the third physical unit, wherein a serial number of the fourth physical unit is arranged after a serial number of the third physical unit.

2. The data storage method according to claim 1, further comprising:

updating the log table in a buffer memory if the data content of the first data is identical to the data content of the second data, so as to record mapping information between the logical unit of the first data and the first physical unit to the log table.

3. The data storage method according to claim 2, further comprising:

storing the information in the log table to the third physical unit in the first management unit.

4. The data storage method according to claim 3, wherein the information in the log table comprises an identifier of the first data.

5. The data storage method according to claim 1, further comprising:

updating a first bit in the logical-to-physical bit map information according to mapping information between the logical unit of the first data and the first physical unit, wherein the updated first bit corresponds to a first logical-to-physical mapping table in the at least one logical-to-physical mapping table.

6. The data storage method according to claim 1, further comprising:

searching the at least one logical-to-physical mapping table according to the logical-to-physical bit map information;

collecting valid data from the first management unit according to a searching result; and erasing the first management unit.

7. The data storage method according to claim 1, further comprising:

generating an identifier of the first data and an identifier of the second data; and comparing the identifier of the first data with the identifier of the second data so as to determine whether the data content of the first data is identical to the data content of the second data.

8. The data storage method according to claim 1, wherein the logical-to-physical bit map information comprises a plurality of bits, and each bit among the bits corresponds to one of the at least one logical-to-physical mapping table.

9. A memory storage device, comprising:

a connection interface, configured to couple to a host system;

a rewritable non-volatile memory module, comprising a plurality of management units, wherein the management units comprise a first management unit; and a memory control circuit unit, coupled to the connection interface and the rewritable non-volatile memory module, wherein the memory control circuit unit is configured to receive first data from the host system, wherein the memory control circuit unit is further configured to map a logical unit of the first data to a first physical unit in the first management unit and configured not to store the first data to the rewritable non-volatile memory module if a data content of the first data is identical to a data content of second data stored in the first physical unit, wherein the memory control circuit unit is further configured to store logical-to-physical bit map information to a second physical unit in the first management unit, wherein the logical-to-physical bit map information corresponds to at least one logical-to-physical mapping table, and the at least one logical-to-physical mapping table is configured for identifying valid data in the first management unit, wherein the memory control circuit unit is further configured to map the logical unit of the first data to a fourth physical unit in the first management unit if the data content of the first data is different from the data content of the second data, wherein the memory control circuit unit is further configured to store information in a log table to a third physical unit in the first management unit, wherein the memory control circuit unit is further configured to store the first data to the fourth physical unit after the information in the log table is stored to the third physical unit, wherein a serial number of the fourth physical unit is arranged after a serial number of the third physical unit.

10. The memory storage device according to claim 9, wherein the memory control circuit unit is further configured to update the log table in a buffer memory of the memory control circuit unit if the data content of the first data is identical to the data content of the second data, so as to record mapping information between the logical unit of the first data and the first physical unit to the log table.

11. The memory storage device according to claim 9, wherein the memory control circuit unit is further configured to update a first bit in the logical-to-physical bit map information according to mapping information between the logical unit of the first data and the first physical unit, wherein the updated first bit corresponds to a first logical-to-physical mapping table in the at least one logical-to-physical mapping table.

12. The memory storage device according to claim 9, wherein the memory control circuit unit is further configured to search the at least one logical-to-physical mapping table according to the logical-to-physical bit map information, wherein the memory control circuit unit is further configured to collect valid data from the first management unit according to a searching result, wherein the memory control circuit unit is further configured to erase the first management unit.

13. The memory storage device according to claim 9, wherein the memory control circuit unit is further configured to generate an identifier of the first data and an identifier of the second data, wherein the memory control circuit unit is further configured to compare the identifier of the first data with the identifier of the second data so as to determine whether the data content of the first data is identical to the data content of the second data.

14. A memory control circuit unit for controlling a rewritable non-volatile memory module, wherein the rewritable non-volatile memory module comprises a plurality of management units, the management units comprise a first management unit, and the memory control circuit unit comprises:

a host interface, configured to couple to a host system;
a memory interface, configured to couple to the rewritable non-volatile memory module;
a buffer memory; and
a memory management circuit, coupled to the host interface, the memory interface and the buffer memory, wherein the memory management circuit is configured to receive first data from the host system, wherein the memory management circuit is further configured to map a logical unit of the first data to a first physical unit in the first management unit and configured not to store the first data to the rewritable non-volatile memory module if a data content of the first data is identical to a data content of second data stored in the first physical unit, wherein the memory management circuit is further configured to store logical-to-physical bit map information to a second physical unit in the first management unit, wherein the logical-to-physical bit map information corresponds to at least one logical-to-physical mapping table, and the at least one logical-to-physical mapping table is configured for identifying valid data in the first management unit, wherein the memory management circuit is further configured to map the logical unit of the first data to a fourth physical unit in the first management unit if the data content of the first data is different from the data content of the second data, wherein the memory management circuit is further configured to store information in a log table to a third physical unit in the first management unit, wherein the memory management circuit is further configured to store the first data to the fourth physical unit after the information in the log table is stored to the third physical unit, wherein a serial number of the fourth physical unit is arranged after a serial number of the third physical unit.

15. The memory control circuit unit according to claim 14, wherein the memory management circuit is further configured to update the log table in the buffer memory if the data content of the first data is identical to the data content of the second data, so as to record mapping information between the logical unit of the first data and the first physical unit to the log table.

16. The memory control circuit unit according to claim 14, wherein the memory management circuit is further configured to update a first bit in the logical-to-physical bit map information according to mapping information between the logical unit of the first data and the first physical unit, wherein the updated first bit corresponds to a first logical-to-physical mapping table in the at least one logical-to-physical mapping table.

17. The memory control circuit unit according to claim 14, wherein the memory management circuit is further configured to search the at least one logical-to-physical mapping table according to the logical-to-physical bit map information, wherein the memory management circuit is further configured to collect valid data from the first management unit according to a searching result, wherein the memory management circuit is further configured to erase the first management unit.

18. The memory control circuit unit according to claim 14, wherein the memory management circuit is further configured to generate an identifier of the first data and an identifier of the second data,
wherein the memory management circuit is further configured to compare the identifier of the first data with the identifier of the second data so as to determine whether the data content of the first data is identical to the data content of the second data.

* * * * *